United States Patent Office 3,414,418
Patented Dec. 3, 1968

3,414,418
REFRACTORY COMPOSITION AND METHOD OF MAKING REFRACTORY SHAPES
David H. Hubble and William H. Powers, Franklin Township, Westmoreland County, Pa., assignors to United States Steel Corporation, a corporation of Delaware
No Drawing. Filed Oct. 14, 1966, Ser. No. 586,624
2 Claims. (Cl. 106—57)

ABSTRACT OF THE DISCLOSURE

An alumina refractory composition which contains small percentages of SrO and $ZrO_2$. Composition is prepared by mixing the latter two materials with lightly calcined alumina, briquetting the mixture, and firing the briquettes at a temperature of about 2800° to 3100° F. The briquettes are then ground, and the grains pressed into bricks and fired. The bricks have superior hot strength and good resistance to thermal shock.

---

This invention relates to an improved alumina refractory composition and to a method of making refractory shapes.

Refractory shapes of conventional high-density alumina compositions have satisfactory hot strength, but poor resistance to thermal shock. Low-density alumina compositions produce shapes which have good resistance to shock, but lower hot strength. The following test results are typical of what may be expected with shapes formed of conventional alumina compositions:

| Type | Apparent porosity, percent | Modulus of rupture at 2,700 F., p.s.i. | Thermal shock test |
|---|---|---|---|
| High-density | 15.0 | 1,550 | Severe cracking. |
| Low-density | 29.0 | 200 | Light cracks. |

In each instance we conducted the shock test by pouring molten steel into a tube of the refractory with half the length of the tube embedded in sand. After the tubes cooled, we examined them for cracking as an indication of their shock resistance.

An object of our invention is to provide an improved alumina refractory composition and method of making refractory shapes to attain superior hot strength, as well as good resistance to thermal shock.

A further object is to provide a composition and method of attaining the foregoing advantage in which we use a minimum of high-cost additives.

A more specific object is to provide a composition and method in which we incorporate small percentages of zirconia and strontia in at least a portion of the grains of an alumina refractory, thereby enabling us to produce shapes having both good hot strength and good resistance to thermal shock.

In making refractory shapes according to our invention, we prefer to follow the usual practice of mixing coarse and fine grain fractions. The coarse fraction or aggregate consists of grains larger than about 40 mesh and constitutes about 50 to 70 percent by weight of the mix, or preferably about 60 percent. The fine fraction or matrix consists of all smaller grains and constitutes about 50 to 30 percent by weight of the mix, or preferably about 40 percent. A refractory shape pressed from a mix of this size distribution tends to have a minimum of voids. We prepare special grains, hereinafter described, which may be either of the coarse fraction or of the fine fraction or both. Preferably our special grains constitute approximately half the grains of each fraction, and the remainder are conventional alumina grains. In this manner we obtain two-phase bonding among the various grains when we subsequently press shapes from the mix and burn them. Nevertheless we attain improved results when our special grains constitute about 20 to 100 percent of the grains of the fine fraction, or about 40 to 100 percent of the grains of the coarse fraction.

In preparing our special grains, we intimately mix into lightly calcined alumina about 1 to 6 percent by weight SrO and about the same weight of $ZrO_2$, or preferably about 2 to 4 percent of each. While we prefer about a 1 to 1 ratio of SrO to $ZrO_2$, we may vary this ratio between about 0.2 and 6.0 to 1. We may use any compound of strontium or zirconium which yields the respective oxide on firing. We prefer an alumina starting material which contains a minimum of 99 percent $Al_2O_3$, or even better 99.5 percent. We briquette the mixture, using conventional apparatus and fire the briquettes at a temperature of about 2800 to 3300 F. We crush the fired briquettes and size the resulting grains into suitable fractions for making refractory shapes. We then combine the size fractions, press and burn the shapes according to conventional practice.

As an example to demonstrate our invention, we prepared a series of bricks and forms for the shock test hereinbefore described. The following table lists the mixes we used and the results:

| Composition | | Brick Form | | Test Form | |
|---|---|---|---|---|---|
| Coarse fraction (60%) | Fine fraction (40%) | Apparent porosity, percent | Modulus of rupture at 2,700 F., p.s.i. | Apparent porosity, percent | Thermal shock test |
| Commercial $Al_2O_3$ Grain | Commercial $Al_2O_3$ grain plus 2% SrO and 2% $ZrO_2$. | 17.5 | 930 | 19.9 | Moderate cracking. |
| Special $Al_2O_3$ grain containing 2% SrO and 2% $ZrO_2$. | Special $Al_2O_3$ grain containing 2% SrO and 2% $ZrO_2$. | 13.8 | 1,580 | 15.5 | Light cracking. |
| Special $Al_2O_3$ grain containing 2% SrO and 2% $ZrO_2$. | Commercial $Al_2O_3$ | 15.0 *16.8 | >1,600 *1,580 | 14.8 *15.1 | Light cracking. No cracking.* |
| Commercial $Al_2O_3$ grain | ½ commercial $Al_2O_3$ grain with ½ special grain containing 2% SrO and 2% $ZrO_2$. | 14.6 *15.5 | >1,600 *1,380 | 15.3 *16.2 | Light cracking. No cracking. |
| ½ commercial $Al_2O_3$ grain with ½ special grain containing 2% SrO and 2% $ZrO_2$ | ½ commercial $Al_2O_3$ grain with ½ special grain containing 2% SrO and 2% $ZrO_2$. | 14.3 *14.8 | >1,600 *1,440 | 14.9 *15.3 | Light cracking. No cracking. |

*Burned at 2,900 F., all others burned to 3,100 F.

The foregoing table shows that refractory shapes prepared in accordance with our invention possess both superior hot strength and thermal shock resistance. In the brick first listed, we merely added strontia and zirconia to conventional alumina grains; that is, we did not prepare our special grains which actually incorporate these materials in the grain composition. The result establishes that we do not attain the benefits of our invention unless we first prepare our special grain.

We should point out further that zirconia is a relatively high-cost material, while alumina and strontia are much lower cost. Our refractory shapes contain a maximum of about 6 percent by weight of zirconia, and preferably considerably less. Therefore our invention is economical.

While we have described only certain preferred compositions and methods, it is apparent modifications may arise. Therefore we do not wish to be limited by the disclosure set forth but only by the scope of the appended claims.

We claim:
1. A method of making a refractory shape comprising:
   forming a mixture which consists of about 1 to 6 percent by weight SrO, about 1 to 6 percent by weight $ZrO_2$, and the remainder substantially $Al_2O_3$, the ratio of SrO to $ZrO_2$ being between about 0.2 and 6.0 to 1;
   briquetting said mixture;
   firing the briquettes at a temperature of about 2800 to 3100 F.;
   grinding the briquettes to form grains;
   sizing the grains to form coarse and fine fractions;
   mixing the grains of said coarse and fine fractions with coarse and fine grains of $Al_2O_3$ in proportions to provide a coarse fraction which includes at least about 40 percent grains from said briquettes and a fine fraction which includes at least about 20 percent grains from said briquettes;
   mixing said fractions to form a mxiture consisting of about 50 to 70 percent by weight coarse fraction and about 50 to 30 percent by weight fine fraction;
   and pressing and burning the latter mixture.
2. A method as defined in claim 1 in which both said coarse and fine fractions are mixed in proportions of about 50 percent grains from said briquettes and 50 percent grains of $Al_2O_3$.

References Cited

UNITED STATES PATENTS 2,308,115   1/1943   Schwartzwalder et al.

106—62

JAMES E. POER, *Primary Examiner.*